*Fig:1*

June 6, 1950     H. DE FRANCE     2,510,621
PICTURE AND SOUND TRANSMITTER

Filed Nov. 19, 1946     5 Sheets-Sheet 4

INVENTOR
HENRI DE FRANCE
BY
ATTORNEYS

June 6, 1950        H. DE FRANCE        2,510,621

PICTURE AND SOUND TRANSMITTER

Filed Nov. 19, 1946        5 Sheets-Sheet 5

INVENTOR
HENRI DE FRANCE

BY
Bailey, Stephens & Huettig
ATTORNEYS

Patented June 6, 1950

2,510,621

UNITED STATES PATENT OFFICE 2,510,621

PICTURE AND SOUND TRANSMITTER

Henri de France, Saint-Cloud, France

Application November 19, 1946, Serial No. 710,784
In France August 12, 1942

Section 1, Public Law 690, August 8, 1946
Patent expires August 12, 1962

3 Claims. (Cl. 178—5.8)

The invention relates to telecinema transmission systems.

The chief object of the invention is to permit the successive transmission of several films, either mute films or talking films.

Preferred embodiments of my invention will be hereinafter described with reference to the accompanying drawings, given merely by way of example and in which:

Fig. 1 diagrammatically shows, in perspective view, a telecinema transmission installation made according to an embodiment of the invention;

Figure 1:
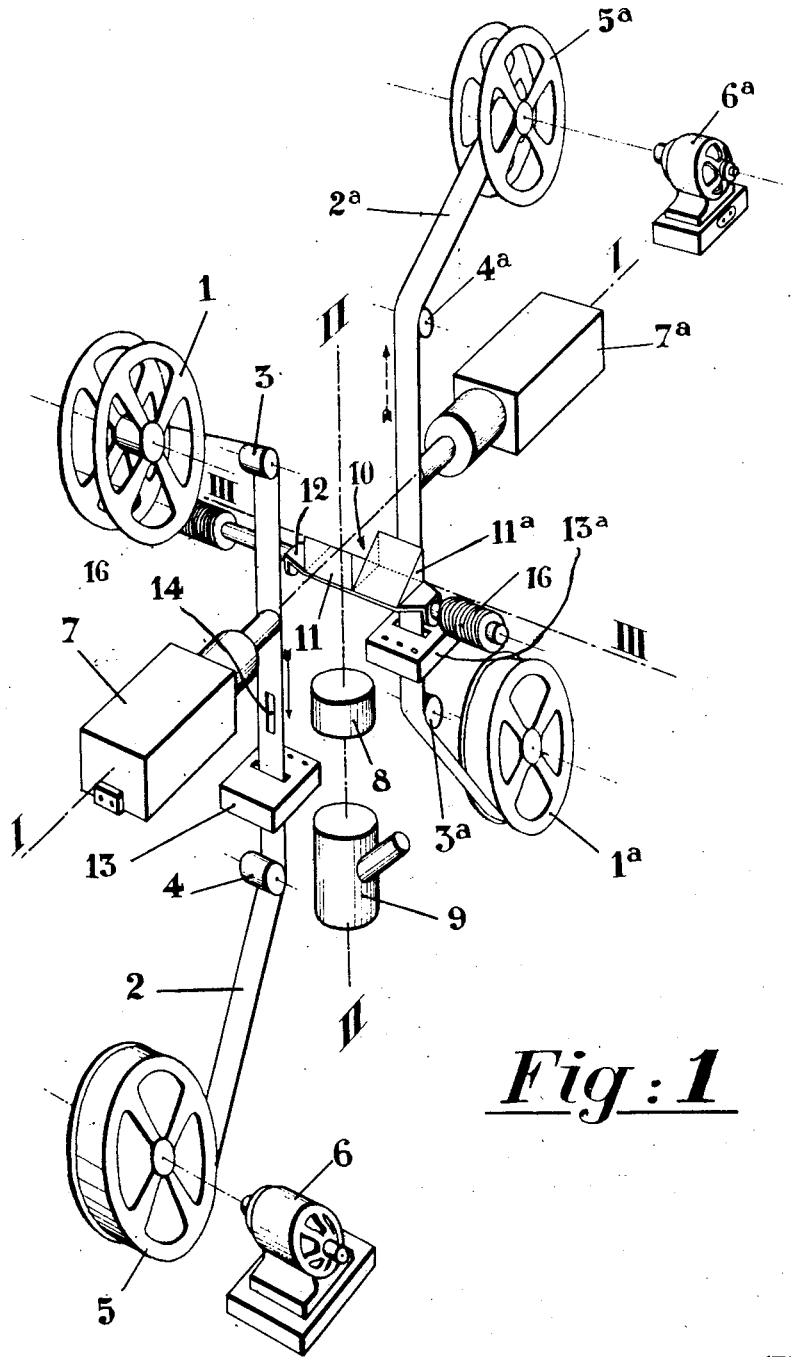

According to my invention, I make use, on the one hand, of a film unwinding apparatus the chief elements of which are shown on Fig. 1, to wit: a reel 1 serving to the unwinding of film 2, two rollers 3, 4 for guiding the film, preferably vertically, and a second reel 5 serving to the winding of the film, driven by means of an electric motor 6, preferably independent.

On the other hand, I dispose of a film illuminating apparatus 7 in such manner that the optical axis of said apparatus is at right angles to the film, i. e. horizontal in the example shown by the drawing.

Finally, I provide an objective 8 arranged in such manner as to receive the illuminated image of film 2 and to give an image thereof capable of being analyzed by an image transmitting apparatus 9, preferably an "Iconoscope" disposed for this purpose after said objective 8.

Let it now be supposed that such an installation is in operation and the film is nearly unwound. It is obvious that a certain time will be necessary for replacing the film that has just been projected by the following one.

In order to avoid this delay, I provide, according to my invention, in said projection installation, a second unwinding device the chief elements of which are represented on Fig. 1 by the same numerals, but with indexes $a$, as the corresponding elements of the first unwinding device. The second unwinding device is adapted to receive, during the operation of the first, the film 2a that follows the one that is being projected.

I provide a lighting device for illuminating film 2a. For this purpose I make use, for instance, of an apparatus 7a distinct from apparatus 7, and I dispose it, with respect to film 2a, in a position analogous to that of apparatus 7 with respect to film 2.

I might pursue the quality of the installation to its end and provide a second "Iconoscope" or the like, with its own objectives. I would thus obtain a system permitting to pass without discontinuity from the projection of a film to that of the following one.

According to my invention I make use of the same image transmission apparatus, for instance "Iconoscope" 9. On the other hand, according to a second feature of my invention which is advantageously used in combination with the first one, I also make use of the same objective 8.

For this purpose, I preferably dispose the two unwinding devices symmetrically with respect to a vertical plane, the illuminating apparatus 7 and 7a being directed toward each other along a common axis I—I.

It will then be understood that after having placed "Iconoscope" 9 and its objective 8 in suitable positions along a vertical axis II—II equidistant from the two vertical portions of films 2 and 2a, it is easy to reflect along axis II—II, by means of an optical device 10 adapted to occupy two positions, light beams respectively and successively transmitted from the illuminated pictures of films 2 and 2a.

In the present example, this device 10 consists of a pair of total reflection prisms 11 and 11a the reflecting faces of which intersect each other at right angles along an axis III—III perpendicular to axes I—I and II—II and passing through their point of intersection. I provide for said prisms a mount 12 adapted to slide parallel to axis III—III on a support not shown by the drawing.

In the installation above described, when film 2, for instance, comes to the end of its projection, it suffices to begin the projection of film 2a and simultaneously to place optical device 10 into its second position for obtaining the desired continuity of projection.

Figure 2:
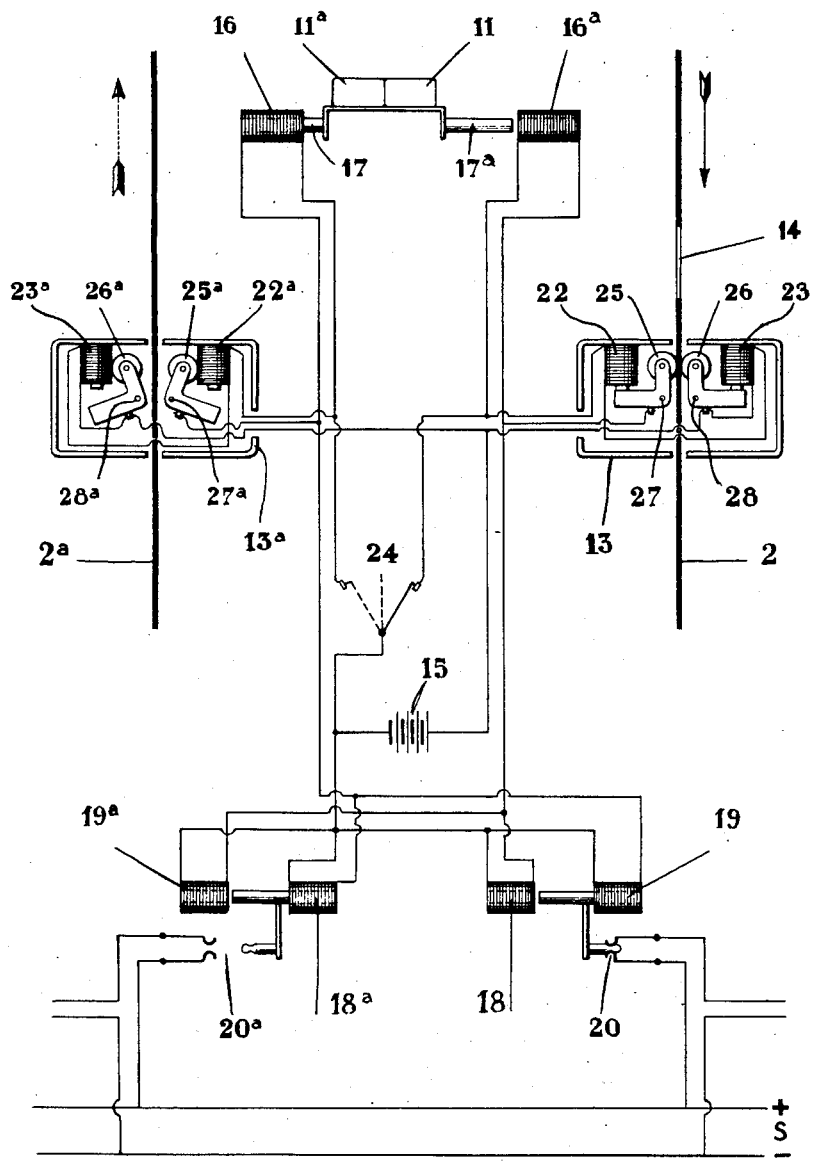
Fig. 2 shows, also diagrammatically, a film projection switching device.

Advantageously, the installation is completed by a device for automatically performing at the proper time the operations necessary for passing from one film to the next one, and this device may be made as follows (Figs. 1 and 2):

The film is passed through an apparatus 13 including a contactor device operated by the passage its elements of an aperture 14 provided in film 2 at the place where its projection is to be replaced by that of film 2a.

The electric contact thus made closes across the terminals of a battery 15 circuits (shown only on Fig. 2) including respectively:

An electro-magnet 16a bringing, through its action on a core 17a, optical device 10 into the position in which prism 11a is in action;

Two electro-magnets 18 and 19a, the first of which opens switch 20, which controls the connection with a current distributing line S of the circuits for the feed of motor 6 and of the illuminating apparatus 7 that corresponds to film 2, and the second of which, 19a, closes the switch 20a that plays an analogous part with respect to the devices corresponding to film 2a.

On the other hand, in order to avoid having the contact elements 21 of contactor 13 rubbing unnecessarily on the whole length of film 2, I provide in said contactor 13 two electro-magnets 22 and 23 which are energized a little before the end of the film by means of a current reversing switch 24 and which apply against each other the two metallic contact rollers 25 and 26 normally held away from the walls of the film by the action of soft iron counterweights pivoting about axes 27 and 28 and included in the electric circuit. On the other hand, switch 24 is adapted to occupy a third position corresponding to the passage from the projection of film 2a to that of film 2, this operation taking place through the action of an electric device analogous to that above described.

Figure 3:
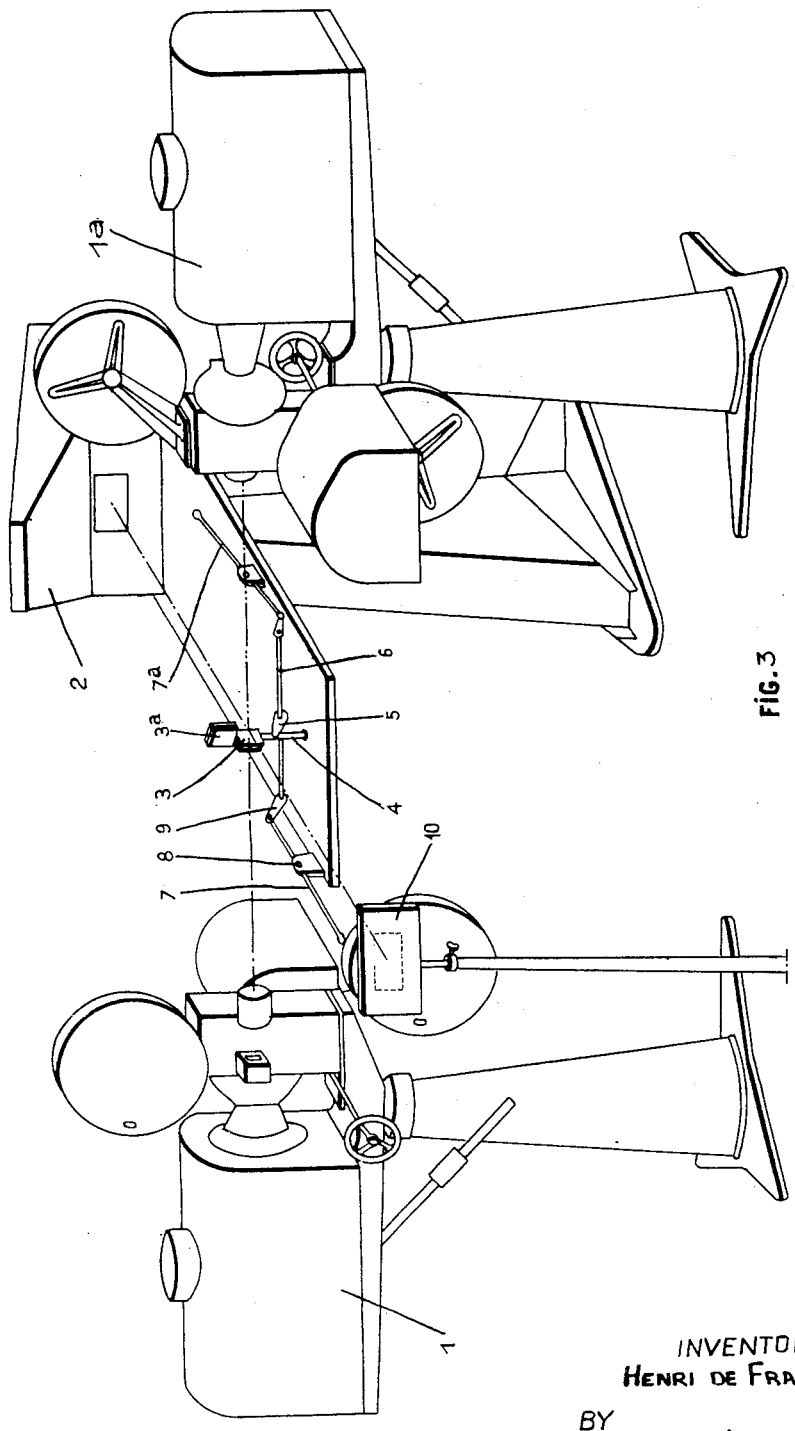
Fig. 3 shows, in perspective view, another embodiment of an installation according to my invention.

According to the embodiment of Fig. 3, I provide two cinema projection apparatus 101 and 101a turned toward each other in such manner that their optical axes coincide, and I dispose, on this common optical axis, preferably midway between the two apparatus, an optical device adapted to return the light rays issuing from one or the other of said apparatus, onto an image transmitting apparatus 102, such as an "Iconoscope," the optical axis of which is advantageously disposed at right angles to the above mentioned one and in the same horizontal plane.

Advantageously, this optical device is constituted by a first mirror 103 adapted to cause said "Iconoscope" 102 to coact with the projection apparatus, and a second mirror 103 adapted to cause the same "Iconoscope" to coact with projection apparatus 101a. Advantageously, these two mirrors are disposed one above the other and are rigid with a vertical rod 104 sliding, for instance, in the frame of said "Iconoscope." I bring one or the other of these mirrors into action through a switching device which may be of any construction but will be advantageously made as follows.

This device includes a lever 105 pivoted to said rod 104 and rigid with a horizontal rod 106 adapted to be rotated about its axis through an operating lever 107 pivoted at 108 on the frame of the "Iconoscope" and hinged at the other end to a lever 109 rigid with said rod 106. Furthermore, I preferably provide a second operating lever 107a connected in an analogous manner to said rod 106 in such manner as to enable the operator to act upon the position of said mirrors whatever be the projection apparatus near which he is standing.

Figure 4:
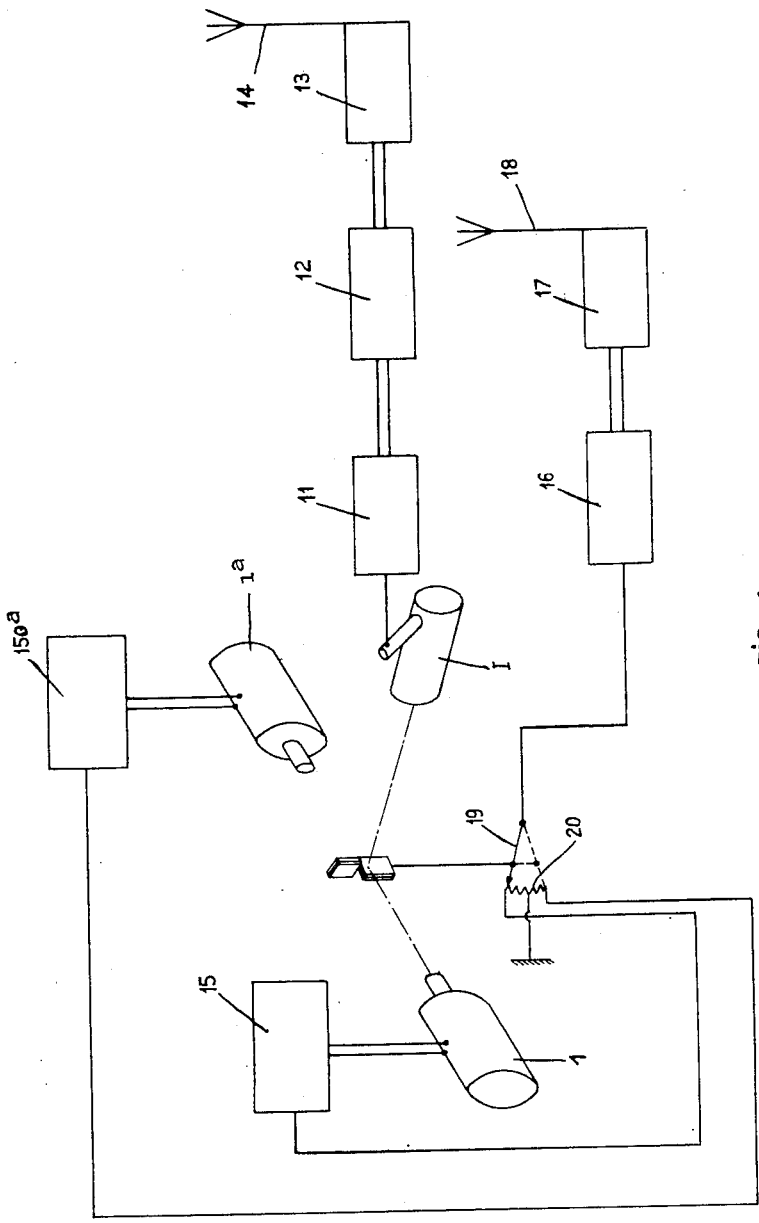
Figs. 4 and 5 show, diagrammatically, talking telecinema transmission installations made, respectively, according to two respective embodiments of my invention.
Figure 5:
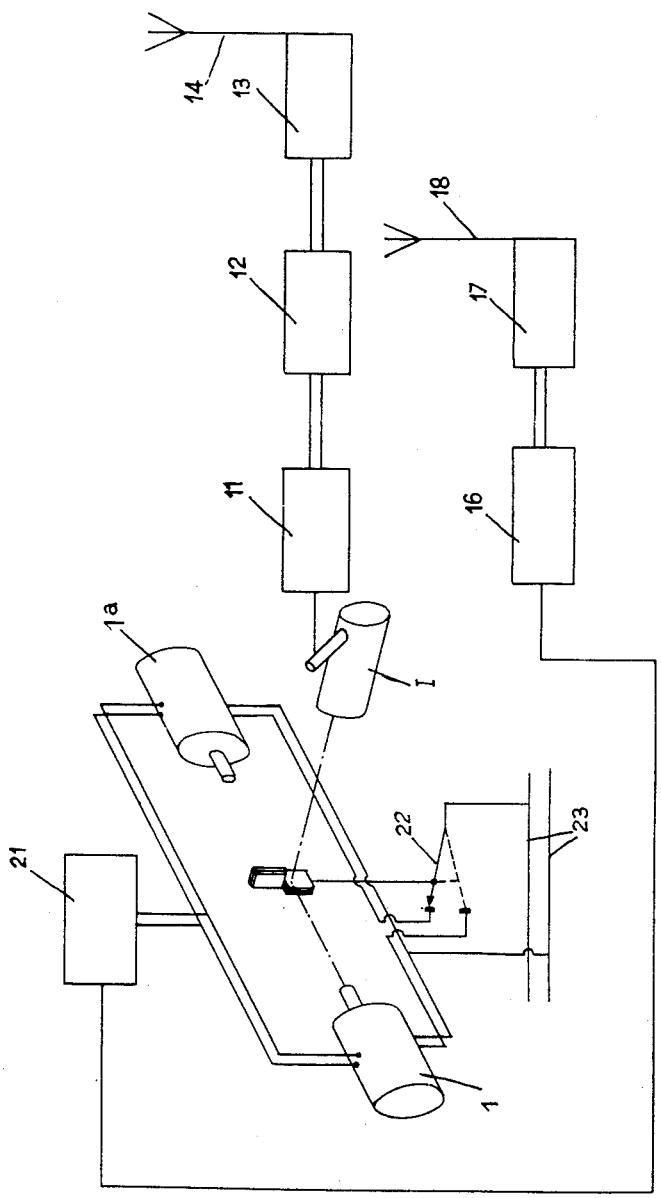

The installation further includes, concerning the transmission of images, an amplifier 111 (Figs. 4 and 5) coupled with said "Iconoscope" 102, and a modulator 112 and a transmitter 113 fitted with an antenna 114.

In such an installation, or in any similar one, the operator is compelled, in order to focus the image of the film the projection of which is beginning, to do this during the first seconds of this projection, and the fumblings that are inherent in this focussing are therefore transmitted.

This drawback is eliminated, according to another feature of my invention, by providing a checking screen 110 and optical means for projecting onto said screen the film that is going to be transmitted and the projection of which is started before the end of the film that is being transmitted.

This arrangement may be obtained in various ways, and advantageously as follows:

I dispose this screen symmetrically with respect to the mosaic of "Iconoscope" 102 with reference to the vertical plane passing through the common optical axis of said projection apparatus 101 and 101a and I reflect the light rays issuing from that of said two last mentioned apparatus which is to be focussed on the screen in question by means of an optical device analogous to that above described.

This device is preferably constituted by mirrors respectively carried by the backs of said mirrors 103 and 103a, in such manner as to form double face mirrors therewith.

Concerning now the transmission of sound, I provide the installation with any suitable device, in particular two photo-electric cells adapted to be acted upon, respectively, by the sound tracks of the films that are projected, suitably illuminated by lamps included in said projection apparatus and not visible on the drawing.

Each of these cells is respectively coupled with amplifiers 115 and 115a preferably connected with the same transmission device, which includes a modulator 116, a transmitter 117 and an antenna 118, through a switch device of the Fader type.

The latter is constituted by a contactor lever 119 coacting with a resistance 120, the two ends of which are connected respectively with said amplifiers 115 and 115a of the cells and the middle part of which is earthed.

This last mentioned switch and the optical device for shifting from one film to the other are operated through the same control means.

For this purpose, according to a particularly advantageous embodiment, I make use of the rod 104 which carries mirrors 103 and 103a for transmitting the movements of operating lever 107 or 107a to the sound switch device, for instance, by pivotally connecting this rod 104 to said lever 119.

According to another embodiment, the device for shifting sound transmission from one film to the next one is constituted by a switch acting, not on a current already modulated by the photo-electric or analogous cells, but by the feed current of the lamps that illuminate the respective sound tracks of the films.

In this case, the photo-electric cells are connected in parallel with a common amplifier 121 (Fig. 5) which is connected, as above, with a modulator 116 followed by a transmitter 117 and an antenna 118. The switch for controlling the lamps by which the sound tracks are illuminated includes a contactor lever 122 adapted to occupy two positions corresponding respectively to the switching of one or the other of said illuminating lamps on line 123, and said lever is controlled in a manner analogous to that already described for the lever 119 of Fig. 4.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A telecinema transmission system which comprises, in combination, means for unwinding two different films along two different paths, respectively, means for separately illuminating said paths, a common image transmitter, means for projecting at will the images of one or the other of said films onto said image transmitter, a viewing screen and means for projecting onto said screen before the end of the transmission of one film the first pictures of the other film.

2. A telecinema transmission system which comprises, in combination, means for unwinding two different cinematographic films, two illuminating means for projecting light beams through said films respectively, a single television camera having a transmitter screen, shifting means for directing onto said screen the film modulated light beam from either of said illuminating means, alternately, a viewing screen, and means for directing onto said viewing screen the light beam which is not being directed toward said camera screen.

3. A telecinema transmission system which comprises, in combination, means for unwinding two different cinematographic films, two illuminating means for projecting light beams through said films respectively, said light beams being directed along a common line but in opposed directions, a single television camera having a transmitter screen located in a plane parallel to said line, two movable mirrors capable, when brought across said line, of reflecting each the light beam from one of said illuminating means onto said screen, shifting means for alternately bringing one of said mirrors across said line and moving the other away therefrom, an auxiliary screen symmetrical of the camera screen with reference to a plane passing through said line and parallel to the camera screen, and mirror means carried by said first mentioned mirrors respectively for reflecting onto said auxiliary screen the light beam which is not being reflected toward said camera screen.

HENRI DE FRANCE.

REFERENCES CITED

The following references are of record in the file of this patent:

UNITED STATES PATENTS

| Number | Name | Date |
|---|---|---|
| 1,984,336 | Danle | Dec. 11, 1934 |
| 2,000,694 | Felix | May 7, 1935 |
| 2,221,091 | Goldsmith | Nov. 12, 1940 |
| 2,250,169 | Schwarzer | July 22, 1941 |
| 2,314,680 | Batsel | Mar. 23, 1943 |

FOREIGN PATENTS

| Number | Country | Date |
|---|---|---|
| 398,228 | Great Britain | Sept. 11, 1933 |
| 417,181 | Great Britain | Sept. 28, 1934 |

OTHER REFERENCES

"Television" by Zworykin, 1940, pp. 581 to 590. (Copy in Div. 16.)

Ser. No. 428,971 (abandoned), De France (A. P. C.), published June 15, 1943.